(12) United States Patent
Ahn et al.

(10) Patent No.: US 9,853,289 B2
(45) Date of Patent: Dec. 26, 2017

(54) LITHIUM SECONDARY BATTERY COMPRISING SPHERICAL GRAPHITE AS ANODE ACTIVE MATERIAL

(71) Applicant: LG Chem, Ltd., Seoul (KR)

(72) Inventors: Byoung Hoon Ahn, Daejeon (KR); Chang-Wan Koo, Daejeon (KR); Joon Sung Bae, Daejeon (KR); Jae Bin Chung, Daejeon (KR)

(73) Assignee: LG Chem, Ltd. (KR)

( * ) Notice: Subject to any disclaimer, the term of this patent is extended or adjusted under 35 U.S.C. 154(b) by 431 days.

(21) Appl. No.: 14/230,078

(22) Filed: Mar. 31, 2014

(65) Prior Publication Data

US 2014/0212750 A1    Jul. 31, 2014

Related U.S. Application Data

(63) Continuation of application No. PCT/KR2012/010404, filed on Dec. 4, 2012.

(30) Foreign Application Priority Data

Dec. 9, 2011 (KR) .................. 10-2011-0131575

(51) Int. Cl.
*H01M 4/587* (2010.01)
*C01B 31/04* (2006.01)
(Continued)

(52) U.S. Cl.
CPC ............. *H01M 4/587* (2013.01); *C01B 31/04* (2013.01); *H01M 4/133* (2013.01);
(Continued)

(58) Field of Classification Search
CPC .............................. H01M 4/133; C01B 31/04
See application file for complete search history.

(56) References Cited

U.S. PATENT DOCUMENTS 7,485,395 B2    2/2009   Kim et al.
8,003,257 B2    8/2011   Takeuchi et al.
(Continued)

FOREIGN PATENT DOCUMENTS

CN    1909269 A      2/2007
CN    101292389 A    10/2008
(Continued)

OTHER PUBLICATIONS

International Search Report for PCT/KR2012/010404 dated Mar. 4, 2013.
(Continued)

*Primary Examiner* — Stephan Essex
(74) *Attorney, Agent, or Firm* — Lerner, David, Littenberg, Krumholz & Mentlik, LLP

(57) ABSTRACT

Disclosed is an anode active material for lithium secondary batteries that includes natural graphite particles consisting of spherical particles of agglomerated graphite sheets, outer surfaces of which are not coated with a carbon-based material, wherein the surfaces of the particles have a degree of amorphization of at least 0.3 within a range within which an R value [$R=I_{1350}/I_{1580}$] ($I_{1350}$ is the intensity of Raman around 1350 cm$^{-1}$ and $I_{1580}$ is the intensity of Raman around 1580 cm$^{-1}$) of a Raman spectrum is in the range of 0.30 to 1.0.

12 Claims, 2 Drawing Sheets

(51) Int. Cl.
*H01M 4/133* (2010.01)
*H01M 4/1393* (2010.01)
*H01M 4/36* (2006.01)
*H01M 4/62* (2006.01)
*H01M 10/0525* (2010.01)
*H01M 4/02* (2006.01)

(52) U.S. Cl.
CPC ......... *H01M 4/1393* (2013.01); *H01M 4/364* (2013.01); *H01M 4/622* (2013.01); *H01M 10/0525* (2013.01); *H01M 2004/021* (2013.01)

(56) References Cited

U.S. PATENT DOCUMENTS

| | | | | |
|---|---|---|---|---|
| 2006/0073387 | A1* | 4/2006 | Sakagoshi | H01M 4/133 429/231.8 |
| 2006/0115730 | A1* | 6/2006 | Taniguchi | H01M 4/131 429/217 |
| 2007/0092428 | A1 | 4/2007 | Sotowa et al. | |
| 2008/0241702 | A1* | 10/2008 | Takahashi | H01B 1/24 429/332 |
| 2011/0195313 | A1 | 8/2011 | Lee et al. | |
| 2011/0262802 | A1* | 10/2011 | Uono | B82Y 30/00 429/188 |
| 2012/0034522 | A1* | 2/2012 | Sheem | H01M 4/13 429/213 |
| 2012/0070733 | A1 | 3/2012 | Yamada et al. | |
| 2012/0219863 | A1* | 8/2012 | Takahashi | H01M 4/587 429/231.8 |

FOREIGN PATENT DOCUMENTS

| | | |
|---|---|---|
| JP | 2003132889 A | 5/2003 |
| JP | 2005-158718 A | 6/2005 |
| JP | 2005222867 A | 8/2005 |
| JP | 2007-042620 A | 2/2007 |
| JP | 2007-180025 A | 7/2007 |
| JP | 3958781 B2 | 8/2007 |
| JP | 2009-110968 A | 5/2009 |
| JP | 2010-219036 A | 9/2010 |
| JP | 2010-267540 A | 11/2010 |
| JP | 2011-086617 A | 4/2011 |
| JP | WO 2011052452 A1 * | 5/2011 ............ C01B 31/04 |
| KR | 10326447 B1 | 2/2002 |
| KR | 20040057416 A | 7/2004 |
| KR | 20090052220 A | 5/2009 |
| KR | 20100040663 A | 4/2010 |

OTHER PUBLICATIONS

Wang, et al, "Raman Spectroscopy of Carbon Materials: Structural Basis of Observed Spectra." Chemistry of Materials (1990) 2, 557-563.

* cited by examiner

LITHIUM SECONDARY BATTERY COMPRISING SPHERICAL GRAPHITE AS ANODE ACTIVE MATERIAL

CROSS-REFERENCE TO RELATED APPLICATIONS

The present application is a continuation of International Application No. PCT/KR2012/010404 filed on Dec. 4, 2012, which claims the benefit of Korean Patent Application No. 10-2011-0131575, filed on Dec. 9, 2011, the disclosures of which are incorporated herein by reference.

TECHNICAL FIELD

The present invention relates to a lithium secondary battery including spherical natural graphite as an anode active material. More particularly, the present invention relates to an anode active material for lithium secondary batteries that includes natural graphite particles consisting of spherical particles of agglomerated graphite sheets, outer surfaces of which are not coated with a carbon-based material, wherein the surfaces of the particles have a degree of amorphization of at least 0.3 within a range within which an R value of a Raman spectrum is in the range of 0.30 to 1.0.

BACKGROUND ART

Recently, portable electric and electronic devices such as notebook computers, mobile phones, PDAs, and the like have entered widespread in daily life and thus rechargeable secondary batteries, which enable such portable electric/electronic devices to operate even when a separate power supply is not available, are used. Among these secondary batteries, lithium secondary batteries developed in the early 1990's are mainly used because they have higher operating voltage and higher energy density than conventional batteries such as Ni-MH, Ni—Cd, sulfuric acid-lead batteries, and the like. Such lithium secondary batteries tend to be developed as high-capacity lithium secondary batteries according to demand of consumers who prefer lighter and more compact products.

A lithium secondary battery includes a cathode including, as a cathode active material, a lithium-containing composite oxide such as $LiCoO_2$, $LiNiO_2$, $LiMnO_2$, $LiMn_2O_4$, or the like.

Meanwhile, an anode of a lithium secondary battery includes various carbon materials as anode active materials. A carbon material used as an anode active material is classified as a crystalline graphite material and an amorphous carbon material. In general, the crystalline graphite material may be artificial graphite, natural graphite, Kish graphite, or the like. In addition, the amorphous carbon material may be soft carbon obtained by calcining coal-based pitch or petroleum-based pitch at high temperature, hard carbon obtained by calcination of a polymer resin such as phenolic resin, or the like.

In general, a crystalline graphite material and an amorphous carbon material have advantages and disadvantages in terms of voltage smoothness, charge and discharge efficiency, and reactivity with an electrolyte and thus, to manufacture high-capacity and high-efficiency batteries, the two materials are used in combination by a method such as coating or the like, thereby enhancing battery performance.

Recently, crystalline graphite is mainly used by surface coating treatment, and coating of natural anode materials is mainly performed by aqueous anode coating. In the past, a non-aqueous anode coating method was used and, here, N-methyl-2-pyrrolidone (NMP) and PVdF were used as a solvent and a binder, respectively. Currently, water and styrene butadiene rubber (SBR) are widely used as a solvent and a binder, respectively, based on an aqueous anode coating method. That is, an anode is fabricated through coating of natural graphite having high specific surface area as an anode active material by using a smaller amount of SBR than that of existing PVdF, whereby an absolute amount of the anode active material in the anode is increased, which enables production of high capacity batteries.

When natural graphite having high specific surface area is used as an anode active material, however, problems such as clogging of a filter or reduction in slurry dispersibility in a mixing process may occur in electrode fabrication.

Thus, use of anode active materials including graphite obtained by coating natural graphite with amorphous carbon and calcining the resulting material and sheet-type graphite is also proposed.

These technologies require complicated processes such as coating of natural graphite with pitch, calcination thereof, or the like and thus are undesirable in terms of overall cost and manufacturing processability of batteries.

Therefore, there is a high need to develop technologies that fundamentally address these problems and to develop anode materials that are not coated with pitch, enhance battery cycle characteristics, and are desirable in terms of both cost and manufacturing processability.

DISCLOSURE

Technical Problem

The present invention aims to address the aforementioned problems of the related art and to achieve technical goals that have long been waiting to be addressed.

As a result of a variety of various experiments and intensive studies, the inventors of the present invention developed natural graphite including specific spherical particles, outer surfaces of which are not coated with a carbon-based material, wherein the surfaces of the particles have a predetermined degree of amorphization and discovered that, when an anode is manufactured using such natural graphite as an anode active material and an aqueous binder in combination, slurry processability is enhanced, excellent lifespan characteristics are obtained, and excellent effects in terms of costs are obtained, thus completing the present invention.

Technical Solution

In accordance with one aspect of the present invention, provided is an anode active material for secondary batteries that includes natural graphite particles consisting of spherical particles of agglomerated graphite sheets, outer surfaces of which are not coated with a carbon-based material, wherein the surfaces of the particles have a degree of amorphization of at least 0.3 within a range within which an R value [$R=I_{1350}/I_{1580}$] ($I_{1350}$ is the intensity of Raman around 1350 $cm^{-1}$ and $I_{1580}$ is the intensity of Raman around 1580 $cm^{-1}$) of a Raman spectrum is in the range of 0.30 to 1.0.

As such, since the natural graphite particles included in the anode active material are formed as spherical particles, surfaces of which are not coated with a separate carbon-based material and have a high degree of amorphization, a conventional surface coating process may be omitted, and the natural graphite particles are highly dispersible in water and thus enable combination with a water-based binder such as styrene butadiene rubber (SBR) or the like and, consequently, overall performance such as lifespan and the like of secondary batteries may be enhanced.

The natural graphite particles according to the present invention include spherical particles of agglomerated graphite sheets.

Such particles may be prepared by, for example, spherizing sheet-type graphite by blending (e.g., dry impact blending) or milling. In some cases, preparation of such particles may be performed by high-purity treatment with an acid such as HF, HCl, $HNO_3$, or the like, followed by a subsequent process of washing with water. As described above, the surfaces of the spherical particles are not subjected to separate coating such as coating with a carbon-based material.

In addition, the natural graphite particles have a degree of amorphization of at least 0.3 within a range within which an R value [$R=I_{1350}/I_{1580}$] of a Raman spectrum is in the range of 0.30 to 1.0.

From experimental results obtained by the inventors of the present invention, it is confirmed that, when the R value of the Raman spectrum and the degree of amorphization are outside the above-described ranges, it is difficult to anticipate effects as described above.

The particles, surfaces of which satisfy the range of the R value and have a high degree of amorphization, may be prepared by appropriately adjusting the process of agglomerating and spherizing the sheet-type graphite or the subsequent process as described above.

In an exemplary embodiment, the R value may be 0.30 to 0.50, and the degree of amorphization may be 0.3 to 0.5.

In some cases, in such a spherizing process, the surfaces of the particles may have a structure in which a hydrophilic substituent is combined to at least some of the carbon atoms at the surfaces of the particles.

In particular, end portions of some graphite sheets that form the surfaces of the spherical particles among the graphite sheets constituting the spherical particles are unable to have an intrinsic hexagonal bonding structure of graphite due to non-continuous carbon bonds, and thus, carbon atoms of these end portions provide a high degree of amorphization. In addition, to stabilize the spherical particles, the carbon atoms of the end portions may be combined with non-carbon-based substituents, in particular hydrophilic substituents, thereby contributing to a high degree of amorphization and hydrophilicity of the spherical particles.

Examples of the hydrophilic substituents include, but are not limited to, a hydroxyl group, a carboxyl group, a sulfonic acid group, a sulfate group, and an amine group.

In an exemplary embodiment, the natural graphite particles may have an average particle diameter of 21 μm to 25 μm.

When the average particle diameter of the natural graphite particles is less than 21 μm, specific surface area of the spherical graphite particles increases and thus electrode processability may be deteriorated. For example, phase stability may be reduced due to clogging of a filter caused by agglomeration of an anode active material or an increase in viscosity of a slurry in a process of fabricating an electrode, and adhesion between the natural graphite particles and a current collector may be reduced. On the other hand, when the average particle diameter of the natural graphite particles exceeds 25 μm, a conductive network may not be sufficiently secured and thus charge/discharge capacity of a battery may be reduced.

In addition, the natural graphite particles may have a specific surface area of 4.5 to 5.5. When the specific surface area of the natural graphite particles is less than 4.5, discharge capacity may be reduced. On the other hand, when the specific surface area of the natural graphite particles exceeds 5.5, electrode processability may be reduced as in the case in which the average particle diameter of the natural graphite particles is too small.

The anode active material according to the present invention may further include particles of other known anode active materials in addition to the natural graphite particles. Examples of other anode active materials include, but are not limited to, natural graphite, soft carbon, hard carbon, a lithium metal, a sulfur compound, a silicon compound, and a tin compound.

In this case, the amount of the natural graphite particles according to the present invention may be 50 wt % or more, more preferably 90 wt % or more, particularly preferably 95 wt % to 99 wt %, based on a total weight of the anode active material so as to appropriately exhibit effects according to the present invention.

The present invention also provides an anode mixture for secondary batteries that includes the anode active material described above, an aqueous thickening agent, and an aqueous binder.

In general, an anode mixture takes the form of a slurry prepared by adding an anode active material and the like to a solvent and is coated on a current collector to manufacture an electrode.

The anode active material according to the present invention enables preparation of an anode mixture through mixing of the anode active material with an aqueous thickening agent and an aqueous binder by using an aqueous solvent when preparing a slurry, since the natural graphite particles included therein have high water dispersibility.

The aqueous solvent may be water or a solvent prepared by adding an additive such as an alcohol such as ethanol or the like, cyclic amides such as N-methyl pyrrolidone, or the like to water in an amount of about 40 wt % or less with respect to the weight of water.

The aqueous thickening agent is a component assisting in binding between an active material and a conductive material and in binding of the active material to a current collector. The aqueous thickening agent may be added in an amount of 1.0 wt % to 2.0 wt % based on the total weight of the anode mixture. For example, the aqueous thickening agent may be carboxy methyl cellulose (CMC), but embodiments of the present invention are not limited thereto.

The aqueous binder does not cause chemical changes in the fabricated secondary battery and is a component providing adhesion between elements of an electrode active material and a current collector in an electrode mixture in the form of a slurry.

Examples of the aqueous binder include, but are not limited to, acrylonitrile-butadiene rubber, styrene butadiene rubber (SBR), acrylic rubber, hydroxyethylcellulose, carboxymethylcellulose, and polyvinylidene fluoride. Among these, SBR is particularly preferable. The amount of the aqueous binder may be 1.0 wt % to 2.0 wt % based on the total weight of the anode mixture.

In some cases, the anode mixture may further include a conductive material, a filler, and the like.

The conductive material is typically added in an amount of 1 to 30 wt % based on the total weight of a mixture including a cathode active material. There is no particular limit as to the conductive material, so long as it does not cause chemical changes in the fabricated secondary battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The filler is used as a component to inhibit anode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

In addition, the present invention provides an anode manufactured by coating an anode current collector with the anode mixture and drying the coated anode current collector.

The anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. The anode current collector may have fine irregularities at a surface thereof to enhance adhesion between the anode current collector and the anode active material. In addition, the anode current collector may be used in various forms including films, sheets, foils, nets, porous structures, foams, and non-woven fabrics.

The present invention also provides a lithium secondary battery including the anode, a separator, and a cathode.

In general, a lithium secondary battery includes an electrode assembly in which an anode and a cathode are stacked with a separator disposed therebetween and a lithium salt-containing non-aqueous electrolyte.

The cathode is manufactured by coating a mixture of a cathode active material, a conductive material, and a binder on a cathode current collector and drying the coated cathode current collector. As desired, the mixture may further include a filler.

Examples of the cathode active material include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ where $0 \leq y \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-y}M_yO_2$ where M=Co, Mn, Al, Cu, Fe, Mg, B, or Ga, and $0.01 \leq y \leq 0.3$; lithium manganese composite oxides having the formula $LiMn_{2-y}M_yO_2$ where M=Co, Ni, Fe, Cr, Zn, or Ta, and $0.01 \leq y \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; and $Fe_2(MoO_4)_3$.

The binder is a component assisting in binding between an active material and a conductive material and in binding of the active material to a current collector. The binder may be added in an amount of 1 wt % to 50 wt % based on the total weight of a mixture including a cathode active material. Non-limiting examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The cathode current collector is generally fabricated to a thickness of 3 to 500 μm. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of an electrolyte and a lithium salt. As the electrolyte, a non-aqueous organic solvent, an organic solid electrolyte, an inorganic solid electrolyte, or the like may be used.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$.

The lithium salt is a material that is readily soluble in the non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas.

The present invention also provides a battery module including the lithium secondary battery described above as a unit battery.

The lithium secondary battery according to the present invention may exhibit excellent battery characteristics due to the natural graphite particles included in the anode active material and thus, in particular, may be suitable for use in a high-output large-capacity battery module including a plurality of such secondary batteries.

The battery module may be used as a power source for electric vehicles, hybrid electric vehicles, plug-in hybrid electric vehicles, and systems for storing power.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only for illustration of the present invention and should not be construed as limiting the scope and spirit of the present invention.

Example 1

Graphite sheets were agglomerated by milling to prepare spherized natural graphite particles having a diameter of 21 µm, surfaces of which had a degree of amorphization of 0.30, and the natural graphite particles, CMC, and SBR were mixed with water in a weight ratio of 98:1:1 (spherized natural graphite particles:CMC:SBR) to prepare a slurry. The slurry was coated onto a Cu foil and dried and rolled, thereby completing fabrication of an anode.

Example 2

An anode was manufactured in the same manner as in Example 1, except that spherized natural graphite particles having a diameter of 23 µm, surfaces of which had a degree of amorphization of 0.40, were used.

Example 3

An anode was manufactured in the same manner as in Example 1, except that spherized natural graphite particles having a diameter of 21 µm, surfaces of which had a degree of amorphization of 0.45, were used.

Comparative Example 1

An anode was manufactured in the same manner as in Example 1, except that spherized natural graphite particles having a diameter of 22 µm, surfaces of which had a degree of amorphization of 0.23, were used.

Specific surface areas and tap densities of the natural graphite particles prepared according to Examples 1 to 3 and Comparative Example 1 are shown in Table 1 below.

TABLE 1

|  | Particle diameter (µm) | Degree of amorphization | Specific surface area (m$^2$/g) | Tap density (g/cm$^3$) |
| --- | --- | --- | --- | --- |
| Example 1 | 21 | 0.30 | 5.3 | 0.96 |
| Example 2 | 23 | 0.40 | 5.4 | 1.03 |
| Example 3 | 21 | 0.45 | 5.4 | 1.10 |
| Comparative Example 1 | 22 | 0.23 | 5.1 | 0.94 |

[Experimental Example 1] Viscosity Measurement Results

Figure 1:
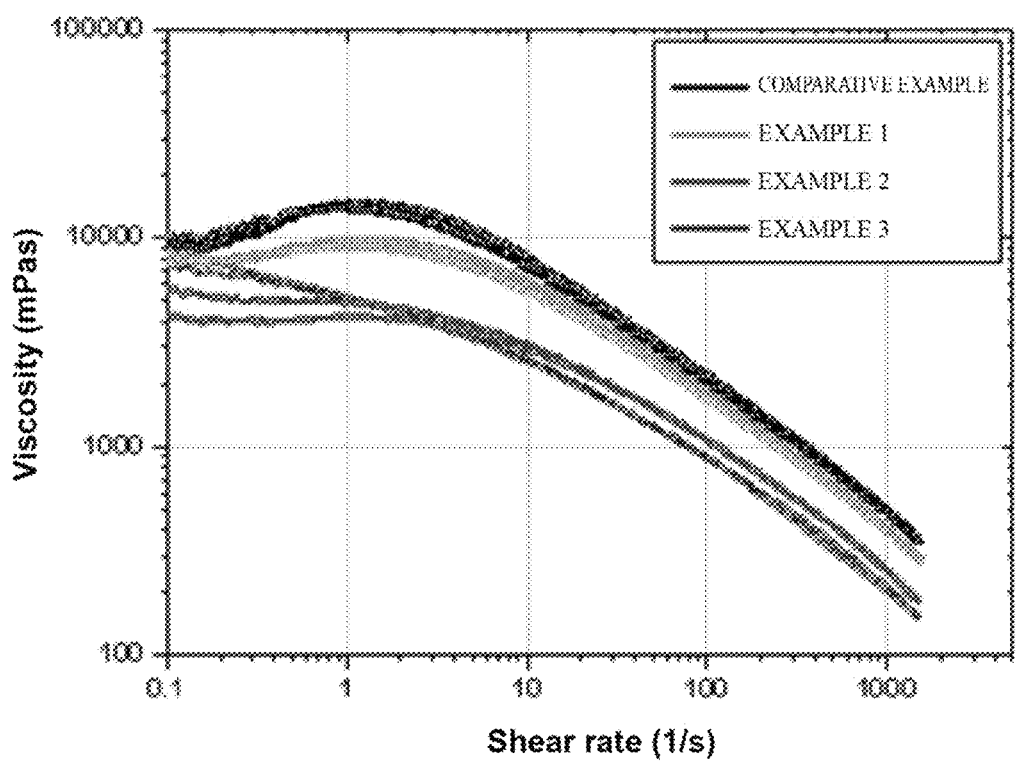
FIG. 1 is a graph showing evaluation results of measurement of the viscosity of a slurry in Experimental Example 1.

Viscosity and stability of the slurries used in Examples 1 to 3 and Comparative Example 1 were measured and measurement results are shown in FIG. 1.

Referring to FIG. 1, the slurries of Examples 1 to 3 have lower viscosity than the slurry of Comparative Example 1, and the slurry of Example 3 does not show a viscosity increase section according to an increase in shear rate, from which it can be confirmed that there is no agglomeration of particles of the anode material. From the results, it can be confirmed that, as a degree of amorphization of the particle surfaces increases, the anode active material and the aqueous binder are smoothly mixed in the slurry using the aqueous binder and, accordingly, viscosity and slurry stability are enhanced.

[Experimental Example 2] Evaluation of Lifespan Characteristics of Coin Half-Cell Each of the anodes manufactured according to Examples 1 to 3 and Comparative Example 1 was assembled with a cathode including $LiCoO_2$ as a cathode active material, PVdF as a binder, and natural graphite as a conductive material to manufacture a coin half-cell. Lifespan characteristics of the coin half-cells were measured by performing charging and discharging at a voltage of 3.0 V to 4.2 V. Measurement results are illustrated in FIG. 2.

Figure 2:
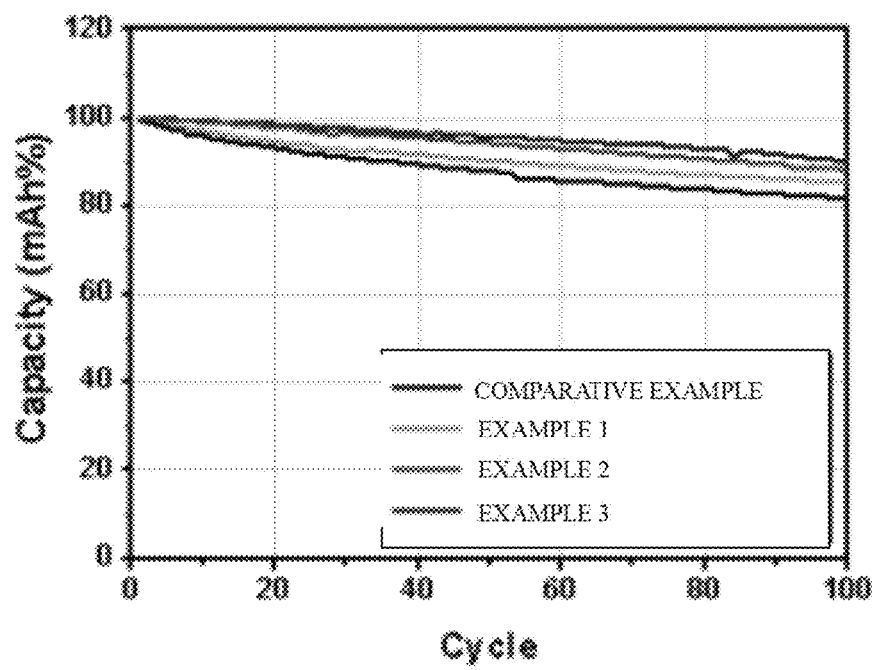
FIG. 2 is a graph showing evaluation results of lifespan characteristics of coin half-cells in Experimental Example 2.

Referring to FIG. 2, the coin half-cells including the anodes of Examples 1 to 3 have superior lifespan characteristics to the coin half-cell including the anode of Comparative Example 1. This is assumed because, as shown in Table 1 above, the anode active materials used in Examples 1 to 3 have higher density than the anode active material used in Comparative Example 1, which indicates that, as the density of an anode active material increases, an electrode is smoothly impregnated with an electrolyte and thus lithium ions vigorously migrate into the electrode, and the lithium ions more rapidly migrate at a surface of an anode active material having a high degree of surface amorphization and thus resistance to migration of lithium ions at the surface of the anode active material is low.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, an anode active material according to the present invention includes natural graphite particles having specific exterior appearance and surface characteristics and thus, when fabricating an electrode using the same, slurry processability may be enhanced, excellent battery lifespan characteristics may be obtained, and manufacturing costs of a battery may be reduced.

The invention claimed is:

1. An anode mixture for secondary batteries, comprising:
an anode active material for lithium secondary batteries;
an aqueous binder; and
an aqueous thickening agent,
wherein the aqueous thickening agent is carboxy methyl cellulose (CMC), and the aqueous binder is styrene-butadiene rubber (SBR),
wherein the anode active material comprises natural graphite particles comprising spherical particles of agglomerated graphite sheets, outer surfaces of which are not coated with a carbon-based material, and
wherein the surfaces of the particles have a degree of amorphization ranging from 0.3 to 0.5 to control viscosity and stability of the mixture and have an R value of a Raman spectrum ranging from 0.3 to 1.0, wherein the R value is represented by the following formula:

$$R = I_{1350}/I_{1580}$$

wherein $I_{1350}$ is a Raman intensity of about 1350 cm$^{-1}$ and $I_{1580}$ is a Raman intensity of about 1580 cm$^{-1}$.

2. The anode mixture according to claim 1, wherein the R value is 0.30 to 0.50.

3. The anode mixture according to claim 1, wherein the natural graphite particles have a hydrophilic substituent combined to at least some of the carbon atoms at surfaces thereof.

4. The anode mixture according to claim 1, wherein the natural graphite particles have an average particle diameter of 21 μm to 25 μm.

5. The anode mixture according to claim 1, wherein the natural graphite particles have a specific surface area of 4.5 m$^2$/g to 5.5 m$^2$/g.

6. The anode mixture according to claim 1, wherein an amount of the natural graphite particles is 90 wt % based on a total weight of the anode active material.

7. The anode mixture according to claim 1, wherein an amount of the CMC is 1.0 wt % to 2.0 wt % based on a total weight of the anode mixture.

8. The anode mixture according to claim 1, wherein an amount of the SBR is 1.0 wt % to 2.0 wt % based on a total weight of the anode mixture.

9. An anode manufactured by coating an anode current collector with the anode mixture according to claim 8 and drying the coated anode current collector.

10. A lithium secondary battery comprising the anode according to claim 9, a separator, and a cathode.

11. A battery module comprising the lithium secondary battery according to claim 10 as a unit battery.

12. The anode mixture according to claim 1, wherein the R value is great than 0.50 to 1.0.

* * * * *